United States Patent Office 3,440,191
Patented Apr. 22, 1969

3,440,191
DIORGANOPOLYSILOXANE COMPOSITIONS
James Caithness Cuthill, Ardrossan, and James McAllan Cormack Thompson, Seamill, Scotland, assignors to Imperial Chemical Industries Limited, London, England, a corporation of Great Britain
No Drawing. Filed Feb. 1, 1966, Ser. No. 523,951
Claims priority, application Great Britain, Feb. 22, 1965, 7,600/65; Nov. 15, 1965, 48,325/65
Int. Cl. C08g 47/04, 47/06
U.S. Cl. 260—18    19 Claims

ABSTRACT OF THE DISCLOSURE

There is provided an organopolysiloxane composition comprising the reaction product of a compound of the general formula

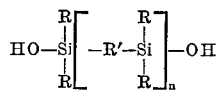

where R is a monovalent hydrocarbyl, R′ is a divalent aromatic group and $n$ is 1, with a compound of the general formula $R_b''SiA_{4-b}$ where R″ is a monovalent hydrocarbyl, hydrogen or a halogen, A is a group OR‴ or $NR_2^{IV}$, R‴ is a monovalent hydrocarbyl, $R^{IV}$ is a monovalent hydrocarbyl or hydrogen and $b$ is 0 or 1; a process for the production to the above organopolysiloxanes is also provided by reacting 4 moles of the diol with at least 1 mole of the silane at temperatures between about 80° and 200° C.

---

This invention relates to new and useful compositions and more particularly to organopolysiloxane compositions, suitable for use as resins for laminating and like purposes.

A wide variety of organopolysiloxane compositions are known and are available, among which are materials suitable for use as resins for laminating and like purposes. Many of these materials, however, are not completely satisfactory, for example, the pot or shelf life is not always adequate and the cured resin does not in all cases have the desired properties, such as good resistance to high temperature.

According to the present invention a new and useful organopolysiloxane composition comprises the reaction product of a compound of the general formula

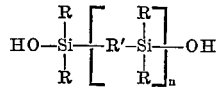

where R is a monovalent hydrocarbyl or substituted hydrocarbyl group, R′ is a divalent aromatic group and $n$ is 0 or 1 with a compound of the general formula $R_b''SiA_{4-b}$ where R″ is a monovalent hydrocarbyl or substituted hydrocarbyl group, hydrogen or a halogen, A is a group OR‴ or $NR_2^{IV}$, R‴ is a monovalent hydrocarbyl or substituted hydrocarbyl group, $R^{IV}$ is a monovalent hydrocarbyl or substituted hydrocarbyl group or hydrogen, and $b$ is 0 or 1, or with a partial hydrolysate or polymerisate thereof.

The groups R, which may or may not be all alike, may be selected from a wide variety of monovalent hydrocarbyl or substituted hydrocarbyl groups and may, for example, be alkyl, aryl, aralkyl, alkaryl, cycloalkyl, alkenyl or cycloalkenyl groups or such groups containing one or more substituents. Suitable groups which may be used include, for example, methyl, ethyl, propyl, 3,3,3-trifluoropropyl, cyclohexyl, phenyl, tetrachlorophenyl, tolyl, vinyl and cyclopentenyl groups. In many cases it is preferred that all the R groups be alike. It is also preferred for many purposes that the R groups be phenyl groups.

The group R′ may be any divalent aromatic group. Suitable groups include, for example, phenylene, diphenylene and diphenyleneoxide groups. In many cases it is preferred that R′ be a phenylene group.

The group R″ may be selected from a wide variety of monovalent hydrocarbyl or substituted hydrocarbyl groups or may be hydrogen or a halogen atom. It may be, for example, an alkyl, aryl, alkaryl, aralkyl, cycloalkyl, alkenyl or cycloalkenyl group or such a group containing one or more substituents or chlorine, bromine or iodine. Suitable groups which may be used include, for example, methyl, ethyl, propyl, n-butyl, 3,3,3-trifluoropropyl, phenyl, tetrachlorophenyl, tolyl, benzyl, cyclohexyl, vinyl and cyclopentenyl groups. In many cases it is preferred that the group R″ be selected from phenyl groups, hydrogen and chlorine.

The group R‴ may be selected from a wide variety of monovalent hydrocarbyl groups or substituted hydrocarbyl groups. Suitable groups which may be used include, for example, such as methyl, ethyl, propyl, butyl, phenyl, ethoxyethyl or methoxyethyl groups. Preferably lower alkyl groups are used and in many cases methyl groups are preferred.

$R^{IV}$ may be selected from the same groups as R‴ or may be hydrogen but is preferably an ethyl group.

The disilanol or silane diol and the silane may be reacted together in widely varying proportions. Thus for every 4 moles of the diol there may be used from 1 to 4 or more moles of the silane. It is, however, in general preferred to use from 1.5 to 3 moles of the silane for every 4 moles of the diol.

The reaction is preferably carried out in the presence of a catalyst of the type known to be suitable for reaction between a compound containing an ≡SiOH group and a compound containing an ≡SiOR group. Suitable catalysts include, for example, carboxylic acid salts of tin, such as stannous octoate, dibutyl tin dilaurate, dibutyl tin 2-ethylhexoate, dioctyl tin oxide and other salts such as zinc octoate. In many cases stannous octoate is preferred. The catalyst may be used in widely varying amounts, for example, up to 5 percent or more by weight of the organosilicon compounds. It is, however, in general preferred to use amounts of from 0.5 to 1.5 percent.

The temperature at which the reaction may be carried out may vary widely. Suitable temperatures may be, for example, from 80 to 200° C. or higher. In any specific case the optimum temperature will in general be governed by the specific reactants and solvent, if any, used since it is normally preferred to operate at the highest practicable temperature and this will, in many cases, be the refluxing temperature of the reaction mixture.

The reaction is preferably carried out in the presence of an inert solvent. Suitable solvents which may be used, include, for example, toluene, o-dichlorobenzene and xylene. The solvent may be used in amounts of, for example, from 70 to 200 percent or more by weight of the organosilicon compounds. If a solvent is used it need not necessarily be removed from the composition before use and in fact it is normally preferred to use an amount of solvent which will give a solution of the desired final concentration.

The time required for complete reaction will vary with the specific reactants used, the proportions thereof, the solvent, if any, and the reaction temperature. In general, reaction is complete in a period of from 1½ to 3 hours. The extent to which the reaction has progressed may be determined, for example, by withdrawing a sample, removing any solvent present therefrom and heating to the insoluble, infusible state. Reaction is normally considered to have progressed sufficiently when the cure time, at 250° C., is not greater than about 30 minutes.

The resins and resin solutions of our invention may be used for a wide range of purposes, for example, for casting films, preparing laminates such as glass fibre or asbestos fibre laminates, preparing filled moulding powders such as glass fibre or asbestos filled moulding powders and the like and can be cured to insoluble, infusible products by heating at temperatures of, for example, 150–250° C.

Our invention is further illustrated by the following examples in which all parts and percentages are by weight.

Example 1

15 parts of 4,4′ - bis(hydroxydiphenylsilyl)diphenyl ether and 2.8 parts of tetraethoxysilane were dissolved in 15 parts of toluene at 100° C. 0.15 part of stannous octoate was then added and the mixture heated under reflux for 30 minutes, after which it was allowed to cool to 20° C. and filtered. The resin solution so obtained was stable at 20° C. for more than 2 months and showed no signs of cross-linking or gelling. A film was cast from this solution on a glass plate and heated to 180° C. for 20 minutes, whereby there was obtained an insoluble, infusible film. The film so obtained had excellent thermal stability and the weight loss after heating for 100 hours at 400° C. was only 25 percent.

A proportion of the resin solution was used to impregnate glass-cloth which was then dried at 20° C. for 12 hours and heated for 20 minutes at 150° C. Pieces of this material were then pressed together for 30 minutes at 100 lbs./sq. in. pressure and 150° C. The laminate so obtained was capable of being sawn and machined without any delamination occurring.

Example 2

500 parts of 4,4′ - bis(hydroxydiphenylsilyl)diphenyl ether, 92 parts of tetraethoxysilane and 500 parts of toluene were heated under reflux for 10 minutes, after which 5 parts of stannous octoate were added and the heating continued. The heating was continued for 1 hour after which the solution was cooled and filtered whereby a clear resin solution was obtained.

Example 3

The procedure of Example 2 was repeated, except that the time of heating was 6 hours. A similar product was obtained, there being no signs of any gelling occurring.

Example 4

43 parts of diphenylsilanediol, 42 parts of tetraethoxysilane and 50 parts of o-dichlorobenzene were heated together under reflux for 5 minutes, after which 2 parts of stannous octoate were added. The heating under reflux was continued for 2 hours whereby there was obtained a clear resin solution. A film cast from this resin solution cured at 250° C. gave an insoluble, infusible film.

Example 5

474 parts of bis(hydroxydiphenylsilyl)benzene, 104 parts of tetraethoxysilane and 400 parts of o-dichlorobenzene were heated under reflux for 5 minutes. 5 parts of stannous octoate were then added and the heating continued for 2 hours. The solution was then cooled and filtered to give a clear resin solution. A film was cast from this solution and cured to a hard, insoluble, infusible film by heating for 5 to 10 minuteees at 180° C.

Example 6

200 parts of bis(hydroxydiphenylsilyl)benzene, 47 parts of tetraethoxysilane and 240 parts of toluene were heated under reflux for 10 minutes. 4.2 parts of stannous octoate were then added and the heating continued for 6 hours. There was thus obtained a clear resin solution. A film cast from this solution was cured to the infusible, insoluble state by heating at 200° C. for 30 minutes.

Example 7

237 parts of 1,4-bis(diphenylhydroxysilyl)benzene, 30 parts of tris(diethylamino)silane and 200 parts of o-dichlorobenzene were heated under reflux for 2 hours. The reaction mixture was thereafter cooled to 20° C. and filtered whereby there was obtained a clear resin solution. A film was cast from this solution when heated for 30 minutes at 180° C. was converted to the insoluble, infusible state.

Example 8

474 parts of 1,4-bis(diphenylhydroxysilyl)benzene, 80 parts of tris(diethylamino)silane and 500 parts of o-dichlorobenzene were heated under reflux for 30 minutes. The reaction mixture was thereafter cooled to 20° C. and filtered whereby there was obtained a clear resin solution. A film cast from this solution when heated for 20 minutes at 180° C. was converted to the infusible, insoluble state. This film was ground to a fine powder which was then heated for 100 hours at 400° C. The loss of weight of the powder was only 14.5 percent.

Example 9

237 parts of 1,4-bis(diphenylhydroxysilyl)benzene, 50 parts of tris(diethylamino)silane and 250 parts of o-dichlorobenzene were heated under reflux for 30 minutes. The reaction mixture was then cooled to 20° C. whereby there was obtained a clear resin solution. A film cast from this solution and heated for 15 minutes at 180° C. was converted to the infusible, insoluble state.

Example 10

280 parts of 1,4-bis(diphenylhydroxysilyl)benzene, 130 parts of phenyltris(diethylamino)silane and 250 parts of o-dichlorobenzene were heated under reflux for 30 minutes. The reaction mixture was thereafter cooled to 20° C. and filtered whereby there was obtained a clear resin solution. A film cast from this solution when heated for 10 minutes at 180° C. was converted to the infusible, insoluble state.

Example 11

280 parts of 1,4-bis(diphenylhydroxysilyl)benzene, 120 parts of n-butyltris(diethylamino)silane and 250 parts of o-dichlorobenzene were heated under reflux for 30 minutes. The reaction mixture was thereafter cooled to 20° C. and filtered whereby there was obtained a clear resin solution. A film cast from this solution when heated for 5 minutes at 180° C. was converted to the infusible, insoluble state.

Example 12

237 parts of 1,4-bis(diphenylhydroxysilyl)benzene, 70 parts of chlorotris(diethylamino)silane and 250 parts of o-dichlorobenzene were heated under reflux for 40 minutes. The reaction mixture was then cooled to 20° C. and filtered whereby there was obtained a clear resin solution. A film cast from this solution when heated for 5 minutes at 250° C. was converted to the insoluble, infusible state.

Example 13

216 parts of diphenylsilanediol, 163 parts of tris-(diethylamino)-silane and 300 parts of o-dichlorobenzene were heated under reflux for 1 hour. The reaction mixture was thereafter cooled to 20° C. and filtered whereby there was obtained a clear resin solution. A film cast from this solution when heated for 10 minutes at 180° C. was converted to the insoluble, infusible state.

What we claim is:

1. An organopolysiloxane composition consisting essentially of the reaction product of a compound of the general formula

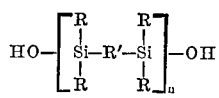

where R is a monovalent hydrocarbyl and monovalent halo hydrocarbyl, R' is a divalent aromatic group and $n$ is 1, with a compound of the general formula $R_b''SiA_{4-b}$ where R" is a monovalent hydrocarbyl and monovalent oxy hydrocarbyl and monovalent halo hydrocarbyl, hydrogen or a halogen, A is a group OR''' or $NR_2^{IV}$, R''' is a monovalent hydrocarbyl and a monovalent alkoxy hydrocarbyl, $R^{IV}$ is a monovalent hydrocarbyl and a monovalent oxy hydrocarbyl or hydrogen and $b$ is 0 or 1.

2. A composition according to claim 1 wherein the R groups are all alike.

3. A composition according to claim 1 wherein R is a methyl, ethyl, propyl, 3,3,3-trifluoropropyl, cyclohexyl, tetrachlorophenyl, tolyl, vinyl or cyclopentenyl group.

4. A composition according to claim 1 wherein the R groups include phenyl groups.

5. A composition according to claim 1 wherein R' is a diphenylene or diphenyleneoxide group.

6. A composition according to claim 1 wherein R' is a phenylene group.

7. A composition according to claim 1 wherein R" is a methyl, ethyl, propyl, n-butyl, 3,3,3-trifluoropropyl, tetrachlorophenyl, tolyl, benzyl, cyclohexyl, vinyl or cyclopentenyl group.

8. A composition according to claim 1 wherein R" is a phenyl group.

9. A composition according to claim 1 wherein R" is a hydrogen atom.

10. A composition according to claim 1 wherein R" is a chlorine atom.

11. A process for the production of an organopolysiloxane composition comprising reacting a diol of the general formula

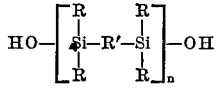

where R is a monovalent hydrocarbyl and monovalent halo hydrocarbyl, R' is a divalent aromatic group and $n$ is 1, with a silane of the general formula $R_b''SiA_{4-b}$ where R" is a monovalent hydrocarbyl and a monovalent oxy hydrocarbyl and monovalent halo hydrocarbyl, hydrogen or a halogen, A is a group OR''' or $NR_2^{IV}$, R''' is a monovalent hydrocarbyl and a monovalent alkoxy hydrocarbyl, $R^{IV}$ is a monovalent hydrocarbyl and a monovalent alkoxy hydrocarbyl or hydrogen and $b$ is 0 or 1, wherein 4 moles of the diol are reacted with at least 1 mole of the silane at a temperature between about 80° and 200° C.

12. A process according to claim 11 wherein 4 moles of the diol are reacted with from 1.5 to 3 moles of the silane.

13. A process according to claim 11 wherein a catalyst selected from dibutyl tin dilaurate, dibutyl tin 2-ethylhexoate, dibutyl tin oxide and zinc octoate is used.

14. A process according to claim 11 wherein stannous octoate is used as a catalyst.

15. A process according to claim 11 wherein the catalyst is used in amounts up to 5 percent by weight of the organosilicon compounds.

16. A process according to claim 15 wherein the catalyst is used in amount from 0.5 to 1.5 percent.

17. A process according to claim 11 wherein reaction is carried out in presence of an inert solvent.

18. A process according to claim 17 wherein the solvent is toluene, o-dichlorobenzene or xylene.

19. A process according to claim 17 wherein the solvent is used in amounts from 70 to 200 percent by weight of the organosilicon compounds.

References Cited

UNITED STATES PATENTS

| | | |
|---|---|---|
| 3,008,913 | 11/1961 | Pangonis. |
| 3,032,528 | 5/1962 | Nitzsche et al. |
| 3,094,497 | 6/1963 | Hyde. |
| 3,133,110 | 5/1964 | Morehouse et al. ____ 260—46.5 |
| 3,135,777 | 6/1964 | Nielson. |
| 3,161,614 | 12/1964 | Brown et al. |
| 3,287,310 | 11/1966 | Omietanski. |
| 3,305,525 | 2/1967 | Goossens. |
| 3,349,048 | 10/1967 | Vaughn _____ 260—465 |

DONALD E. CZAJA, *Primary Examiner.*

M. I. MARQUIS, *Assistant Examiner.*

U.S. Cl. X.R.

117—161, 124; 156—329; 161—193; 260—2, 33.6, 33.8, 46.5, 448.2